(12) United States Patent
Heitmeyer

(10) Patent No.: US 12,640,546 B2
(45) Date of Patent: May 26, 2026

(54) TWO-SHOT MOLDED VAPOR SEAL

(71) Applicant: ALLIED MOULDED PRODUCTS, INC., Bryan, OH (US)

(72) Inventor: Charles Heitmeyer, Defiance, OH (US)

( * ) Notice: Subject to any disclaimer, the term of this patent is extended or adjusted under 35 U.S.C. 154(b) by 194 days.

(21) Appl. No.: 18/585,234

(22) Filed: Feb. 23, 2024

(65) Prior Publication Data

US 2024/0297487 A1    Sep. 5, 2024

Related U.S. Application Data

(60) Provisional application No. 63/487,639, filed on Mar. 1, 2023.

(51) Int. Cl.
H02G 3/08 (2006.01)
H02G 3/12 (2006.01)

(52) U.S. Cl.
CPC ............. H02G 3/083 (2013.01); H02G 3/126 (2013.01)

(58) Field of Classification Search
CPC .......... H02G 3/08; H02G 3/081; H02G 3/083; H02G 3/085; H02G 3/086; H02G 3/088; H02G 3/126
See application file for complete search history.

(56) References Cited

U.S. PATENT DOCUMENTS

| | | | |
|---|---|---|---|
| 4,424,406 A | 1/1984 | Slater et al. | |
| 4,972,044 A * | 11/1990 | Kropa | H02G 3/083 174/660 |
| 6,239,365 B1 | 5/2001 | McEvers | |
| 6,265,670 B1 * | 7/2001 | Duesterhoeft | H02G 3/083 174/152 G |
| 10,205,310 B1 | 2/2019 | Gretz | |
| 11,050,229 B2 | 6/2021 | Baker et al. | |
| 2015/0270693 A1 | 9/2015 | Thornton et al. | |
| 2020/0220341 A1 * | 7/2020 | Hughey | H02G 3/081 |

* cited by examiner

*Primary Examiner* — Roshn K Varghese
(74) *Attorney, Agent, or Firm* — Shumaker, Loop & Kendrick, LLP; James D. Miller

(57)    ABSTRACT

An electrical box assembly is described. The electrical box assembly has a box structure, an opening, and a door disposed within the opening; the door formed of at least two adjacent facets meeting at a frangible region. The electrical box assembly may further include a flange to maintain a vapor barrier when installed within a building structure. The door is configured to maintain a vapor-tight electrical box assembly by forming a vapor-tight seal upon a wire during installation of said wire.

11 Claims, 11 Drawing Sheets

60

45

60

45A

45A

60

TWO-SHOT MOLDED VAPOR SEAL

CROSS-REFERENCE TO RELATED APPLICATION

This patent application claims priority to U.S. Provisional Patent Application Ser. No. 63/487,639, filed on Mar. 1, 2023, the entire disclosure of which is hereby incorporated herein by reference.

FIELD OF THE INVENTION

The present invention relates to electrical boxes such as currently used for mounting electrical devices in walls, floors, and ceilings, and more particularly, to a vapor seal feature for an electrical box.

BACKGROUND OF THE INVENTION

The National Electrical Code requires that electrical boxes be installed during construction for enclosing electrical apparatus' such as switches, sockets, and other electrical connections. Electrical boxes are generally secured to a stud or joist in a wall, ceiling, or floor with the open end of the electrical box installed toward the interior of the building structure. Typically, when an electrical box is installed, the wall's vapor barrier must be broken. One solution to maintaining the vapor barrier is the use of a flange around the electrical box. However, the openings that allow the wires to enter the electrical box provide a further interruption to the wall's vapor barrier even where such a flange is utilized.

Thus, it is highly desirable to provide a new and improved electrical box that prevents the passage of air around the wires passing through the openings providing access to the interior of the electrical box.

BRIEF SUMMARY

The present technology includes articles of manufacture, systems, and processes related to electrical box assemblies with an integrated vapor barrier.

According to an embodiment of the invention, an electrical box assembly includes a box structure comprising a closed end, an oppositely arranged open end, and an interior surrounded by at least one sidewall connecting the open end to the closed end, an opening formed in one of the at least one sidewall or the closed end of the box structure, and a door disposed within the opening and having an outward-facing surface and an inward-facing surface. The door includes an angled recess defined by at least two adjacent facets of the outward-facing surface meeting at a frangible region of the door.

A method of using an electrical box assembly is also disclosed. The method includes a step of providing an electrical box assembly having a box structure comprising a closed end, an oppositely arranged open end, and an interior surrounded by at least one sidewall connecting the open end to the closed end, an opening formed in one of the at least one sidewall or the closed end of the box structure, and a door disposed within the opening and having an outward-facing surface, an inward-facing surface, and an angled recess defined by at least two adjacent facets of the outward-facing surface meeting at a frangible region of the door. The method further includes the step of penetrating the door with a wire with the penetrating of the door including the wire entering the angled recess formed in the outward-facing surface of the door to press against and pierce the door along the frangible region. Another step of the method includes pushing a first length of the wire through the door and into the interior of the box structure.

The electrical box assembly may further include a flange extending outwardly from the box structure, and the flange may include a first surface, facing toward the open end of the box structure, and a second surface, facing toward the closed end of the box structure, each of which are inclined towards the open end of the box structure. The doors of the electrical box assembly may be formed of a resiliently flexible material. The flange of the electrical box assembly may also be formed of a resiliently flexible material. The at least one opening may include a plurality of tabs. The doors and the flange may be formed as a unitary structure. The unitary structure may include one or more connecting portions extending between and connecting the flange to the door.

BRIEF DESCRIPTION OF THE DRAWINGS

The drawings described herein are for illustrative purposes for selected embodiments and not all possible implementations, and are not intended to limit the scope of the present disclosure.

DETAILED DESCRIPTION OF EMBODIMENTS OF THE INVENTION

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 1:
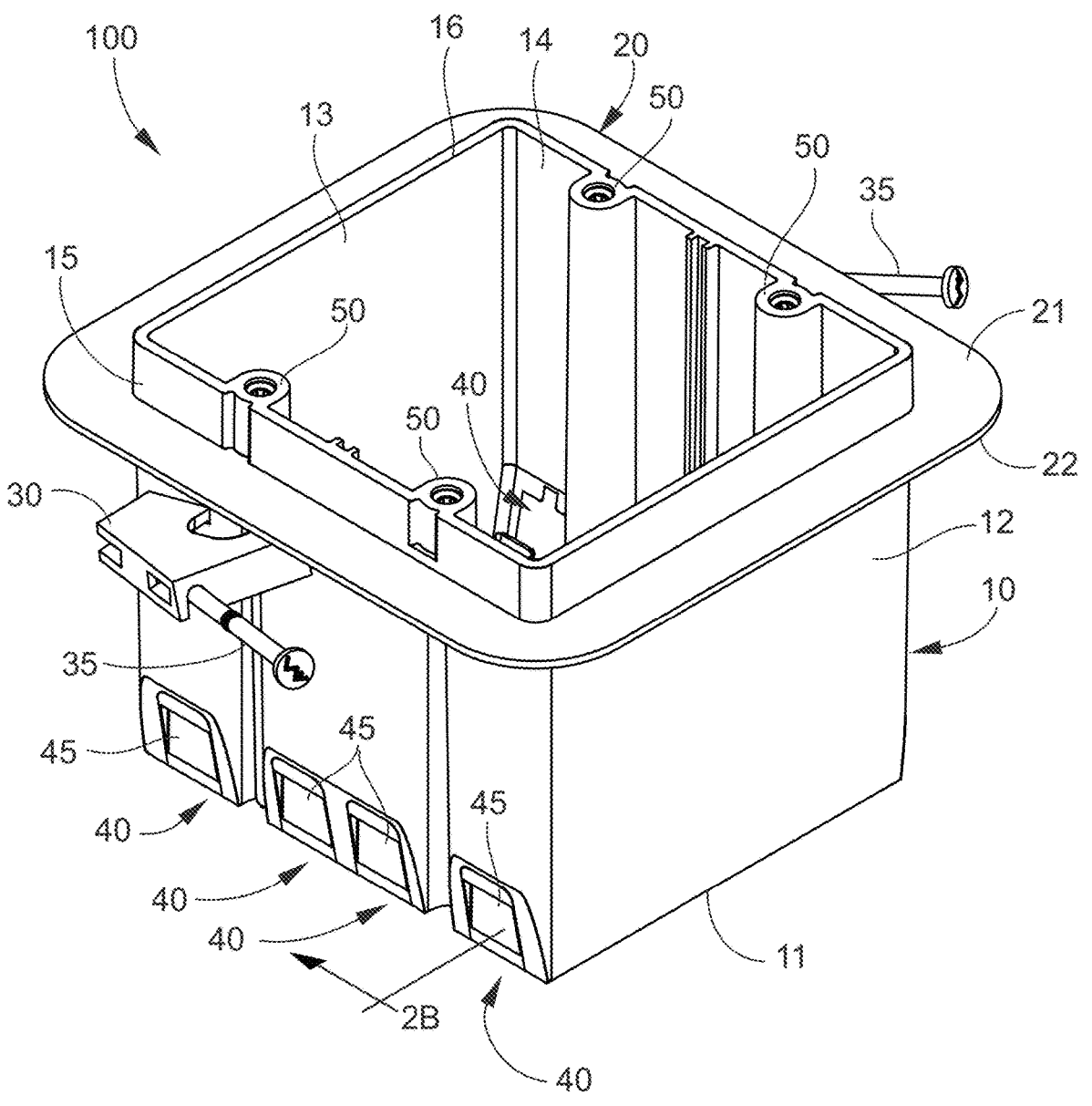
FIG. 1 is a perspective view of an electrical box assembly according to an embodiment of the present invention.
Figure 2A:
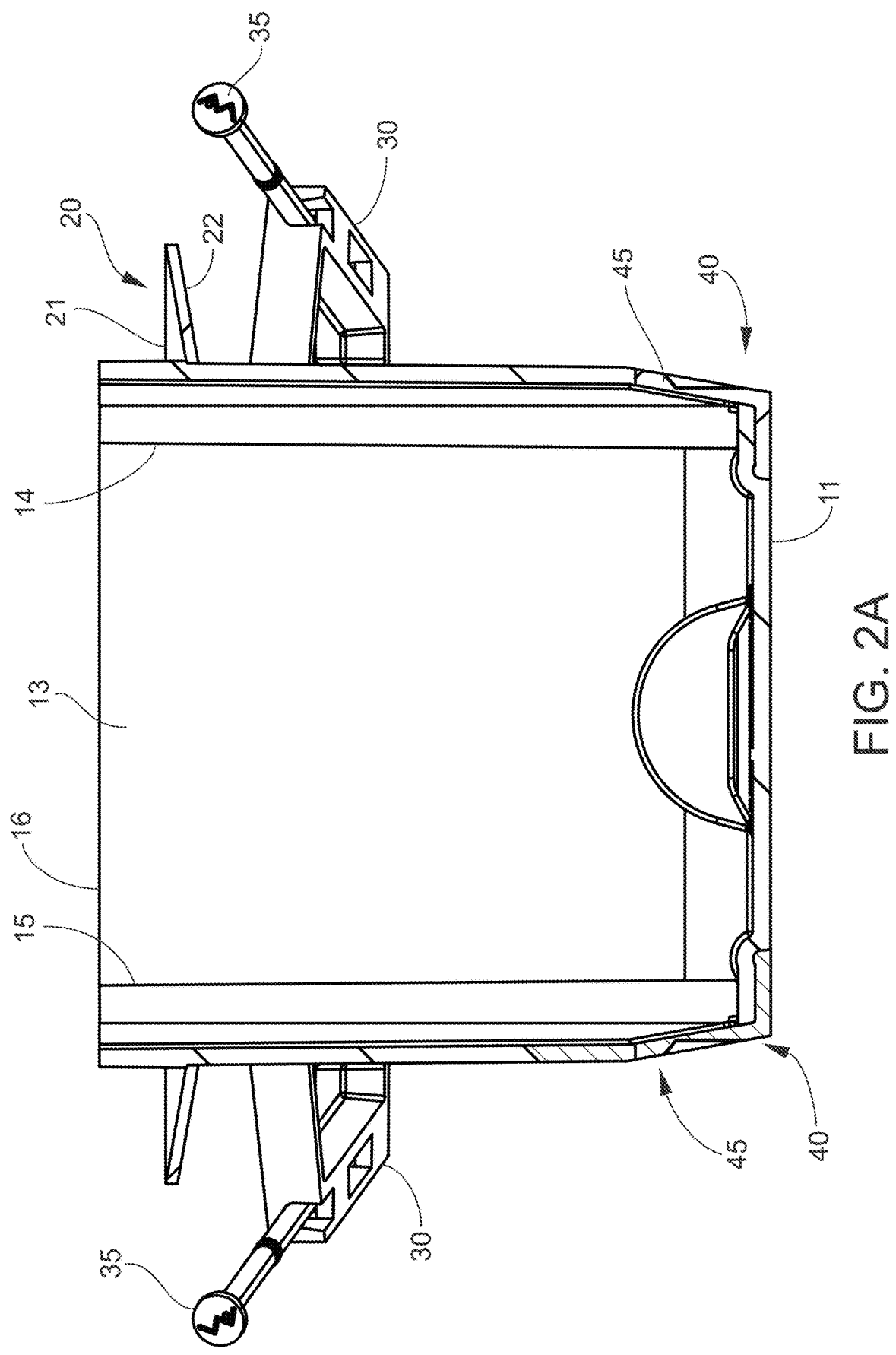
FIG. 2A is a sectional view of the electrical box assembly of FIG. 1.

FIGS. 1 and 2A illustrate an electrical box assembly 100 including an electrical box 10 having an open end 16, a closed end 11, a first sidewall 12, a second sidewall 13, a third sidewall 14, and a fourth sidewall 15. The electrical box 10 includes multiple openings 40 through each of the third sidewall 14 and the fourth sidewall 15, and each of the openings 40 has a corresponding door 45 formed therein.

The electrical box assembly 100 also includes a flange 20 having a first side 21 facing the open end 16 of the electrical box 10 and a second side 22 facing the closed end 11 of the electrical box 10. In some embodiments, the flange of the electrical box assembly is as described in U.S. Pat. No. 11,075,509, the entire disclosure of which, except for any definitions, disclaimers, disavowals, and inconsistencies, is incorporated herein by reference.

The electrical box assembly 100 may further include a coupling mechanism 30 to couple the electrical box assembly 100 with a wall, stud, or other building structure by means of a fastener 35. The fastener 35 may be a nail, a threaded screw, a bolt, or the like, as desired. One skilled in the art should appreciate that any suitable type of coupling mechanism may be utilized for mounting the electrical box assembly 100 to the desired building structure without departing from the scope of the present invention, including adhesives, tapes, clamping mechanisms, swing gates, or the like. The electrical box 10 may also include wall plate fasteners 50 for installing a wall plate to the open end 16 of the electrical box assembly during or after installation.

The electrical box 10 may be formed from a substantially rigid material capable of being formed into the shape and configuration disclosed in FIG. 1. The rigid material may be any of a number of moldable thermoplastic materials including polyvinyl chloride (PVC), polycarbonate, polyphenylene oxide, polyester, and fiberglass-reinforced polyester, as non-limiting examples. Other rigid materials, including but not limited to metals, may be utilized for forming the electrical box 10 without departing from the scope of the present invention.

Figure 2B:
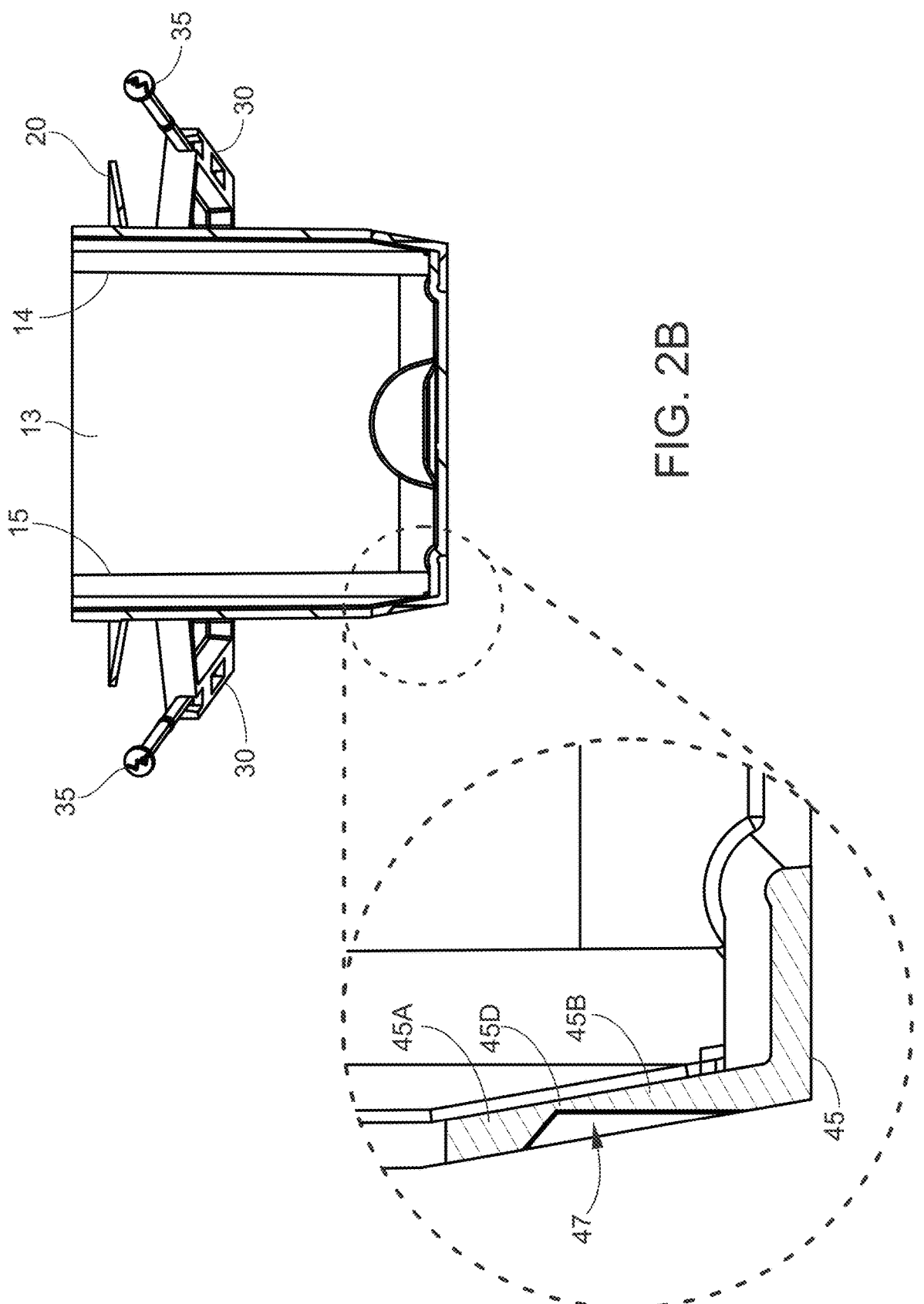
FIG. 2B is a partial view of the sectional view of FIG. 2A.

FIG. 2B illustrates a sectional view of one of the doors 45 disposed within a corresponding one of the openings 40. The door 45 has an interior-facing side and an exterior-facing side. The exterior-facing side includes an angled recess 47 defined by a first facet 45A and a second facet 45B meeting at a frangible region 45D. The frangible region 45D is formed as an interior corner where a surface of the first facet 45A intersects the second facet 45B, wherein the interior corner forming the frangible region 45D may extend laterally and rectilinearly across the door 45 to opposing edges of the window 40. In the illustrated embodiment, the first facet 45A and the second facet 45B include different slopes when progressing inwardly towards the frangible region 45D. More specifically, each of the facets 45A, 45B is inclined relative to a portion of the door 45 disposed immediately exterior to the angled recess 47, wherein this portion of the door 45 may be substantially planar and generally arranged to extend in parallel to a portion of the corresponding sidewall 15 having the opening 40 formed therein. The first facet 45A is shown as including a greater incline relative to the surrounding portion of the door 45 than does the second facet 45B, which results in a length from the outer edge of the first facet 45A to the frangible region 45D being less than a length from the outer edge of the second facet 45B to the frangible region 45D.

The formation of the frangible region 45D as an interior corner between two surfaces aids in piercing the door 45 thereat and guiding a shape of any opening formed through the door 45 as a result of a separation of the first facet 45A from the second facet 45B. The interior-facing side of the door 45 may be provided to be substantially planar opposite the formation of the recess 47 within the exterior-facing side of the door 45 in a manner wherein the sloping of each of the facets 45A, 45B towards the frangible region 45D also results in a thickness of the door 45 decreasing locally towards the frangible region 45D. The frangible region 45D may accordingly form a region where a thickness of the door 45 from the interior to the exterior-facing sides is minimized within the opening 40, or at least minimized locally with respect to a portion of the door 45 corresponding to the formation of the recess 47 therein. The local minimization of the thickness of the door 45 along the frangible region 45D further aids in desirably piercing the door 45 at or adjacent the frangible region 45D in a similar fashion to the presence of the interior corner along the frangible region 45D.

The door 45 may be formed of a resiliently flexible material, such as a suitable elastomeric material. The term "resiliently flexible" as used herein means that when the door 45 is bent and released, including either of the facets 45A, 45B thereof following a separation of the facets 45A, 45B along the frangible region 45D, the door 45 and/or the individual facets 45A, 45B thereof will attempt to return to its original position (such as shown in FIG. 2B) when at room temperature. Materials suitable for forming the door 45 include polyesters, polyurethanes, polyethers, polyamides, polyimides, polycarbonates, polyvinylchloride, and combinations thereof. The flange 20 may also be formed from polyesters, polyurethanes, polyethers, polyamides, polyimides, polycarbonates, polyvinylchloride, and combinations thereof. In some embodiments, the flange 20 and the door(s) 45 are formed of the same material. Alternatively, the flange 20 and the door(s) 45 may be formed of different materials.

Figure 3A:
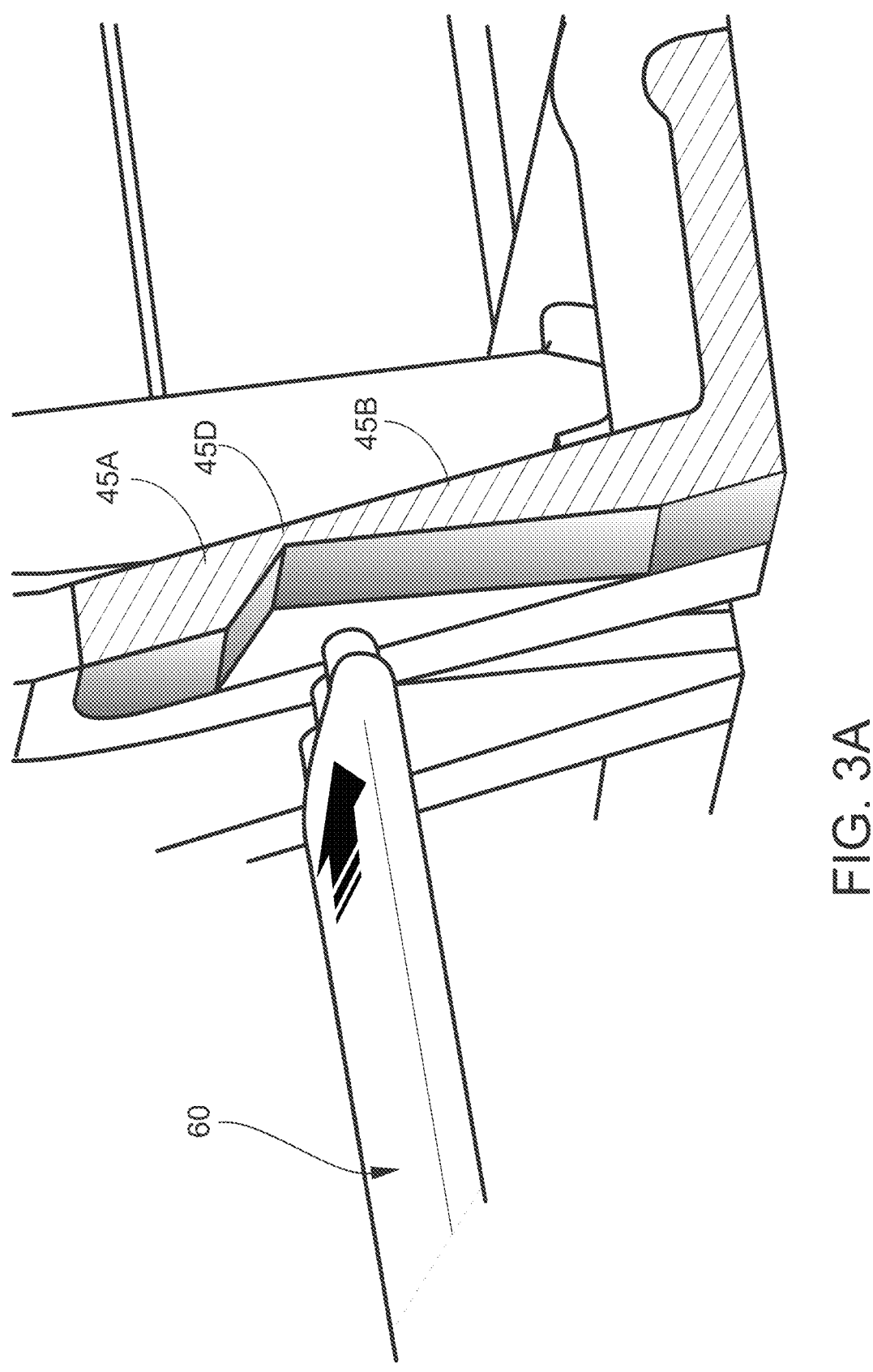
FIG. 3A is a perspective view illustrating a first step in installing a wire into the electrical box assembly of FIG. 1.
Figures 3B, 3C:
FIG. 3B is a perspective view illustrating a second step in installing a wire into the electrical box assembly of FIG. 1.
FIG. 3C is a perspective view illustrating a third step in installing a wire into the electrical box assembly of FIG. 1.
Figure 3D:
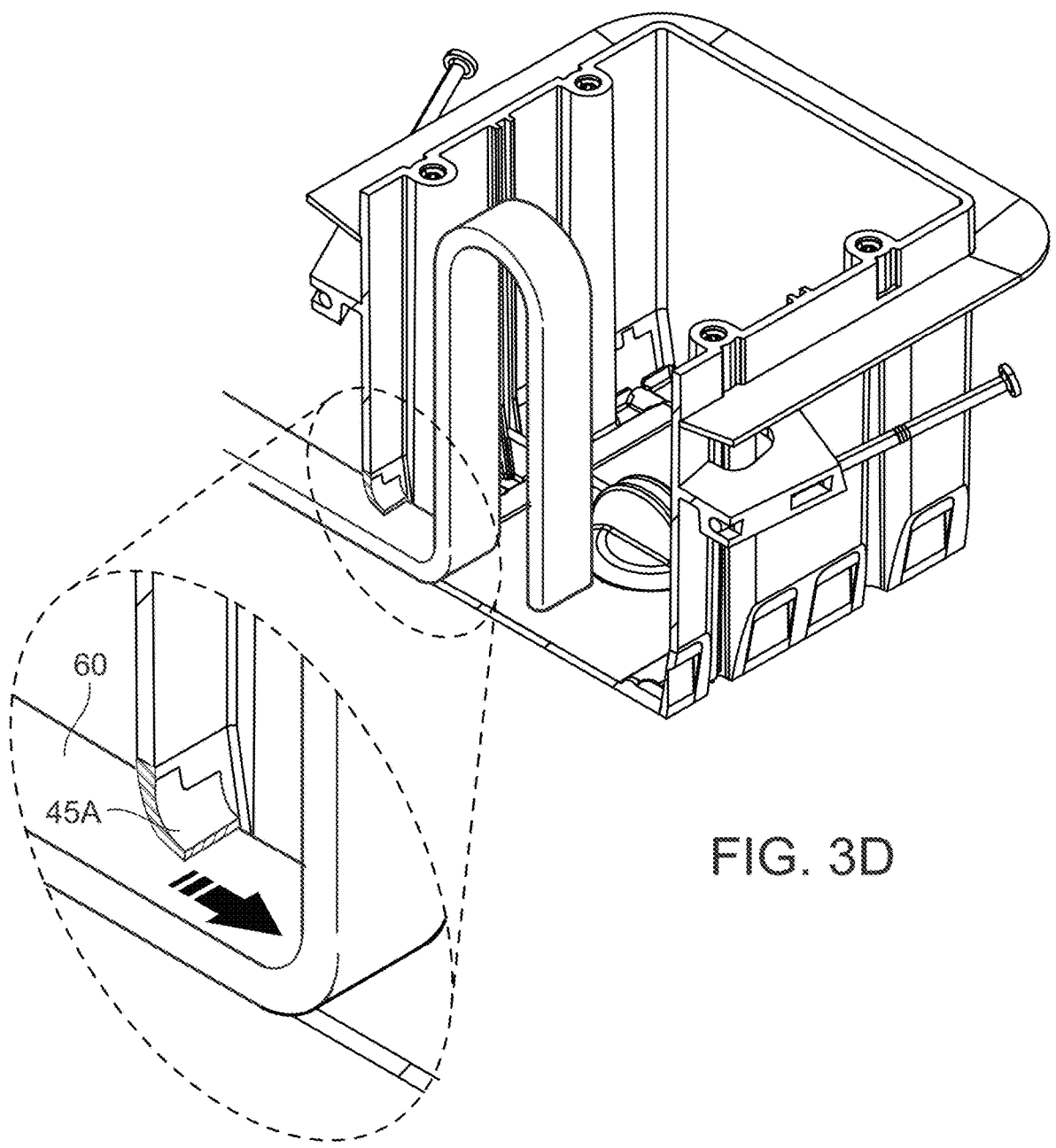
FIG. 3D is a perspective view illustrating a fourth step in installing a wire into the electrical box assembly of FIG. 1.

FIGS. 3A-3E illustrate the process of inserting an electrical wire 60 into one of the openings 40 through a corresponding one of the doors 45. As illustrated in FIGS. 3A and 3B, the wire 60 is inserted into the angled recess 47 at the outward-facing side of the door 45. At FIG. 3C, the wire 60 penetrates the door 45 at the frangible region 45D for separating the first facet 45A and the second facet 45B along the frangible region 45D, which in the present embodiment leads to the formation of a laterally extending opening within the door 45. At FIG. 3D, the wire 60 is further inserted into the interior of the electrical box 10, and in some embodiments is bent to prevent the wire 60 from exiting the electrical box 10 in a reverse direction. As can be seen with respect to FIGS. 3C and 3D, the insertion of the wire 60 in the specified direction results in each of the first facet 45A and the second facet 45B of the door 45 being flexed to pivot inwardly in a direction towards the interior of the electrical box 10 while maintaining contact with the exterior surface of the wire 60 due to the resilient flexibility of the material forming the door 45. That is, the entry of the wire 60 through the door 45 causes the facets 45A, 45B to separate from one another when flexing inwardly such that an attempt by the facets 45A, 45B to return to the configuration shown in FIG. 2B where the distal ends of the facets 45A, 45B (corresponding to the position of the frangible region 45D prior to separation of the facets 45A, 45B) are adjacent and/or in contact with one another. The presence of the wire 60 prevents movement back to this position, hence the resiliency of the material forming the facets 45A, 45B results in each of the facets 45A, 45B flexibly pressing against the exterior surface of the wire when flexed to the configuration of FIGS. 3B and 3C. Such resiliency accordingly prevents the passage of air between the wire 60 and either of the edges of one of the facets 45A, 45B corresponding to the position of the frangible region 45D following the separation of the facets 45A, 45B thereat via the insertion of the wire 60.

Figure 3E:
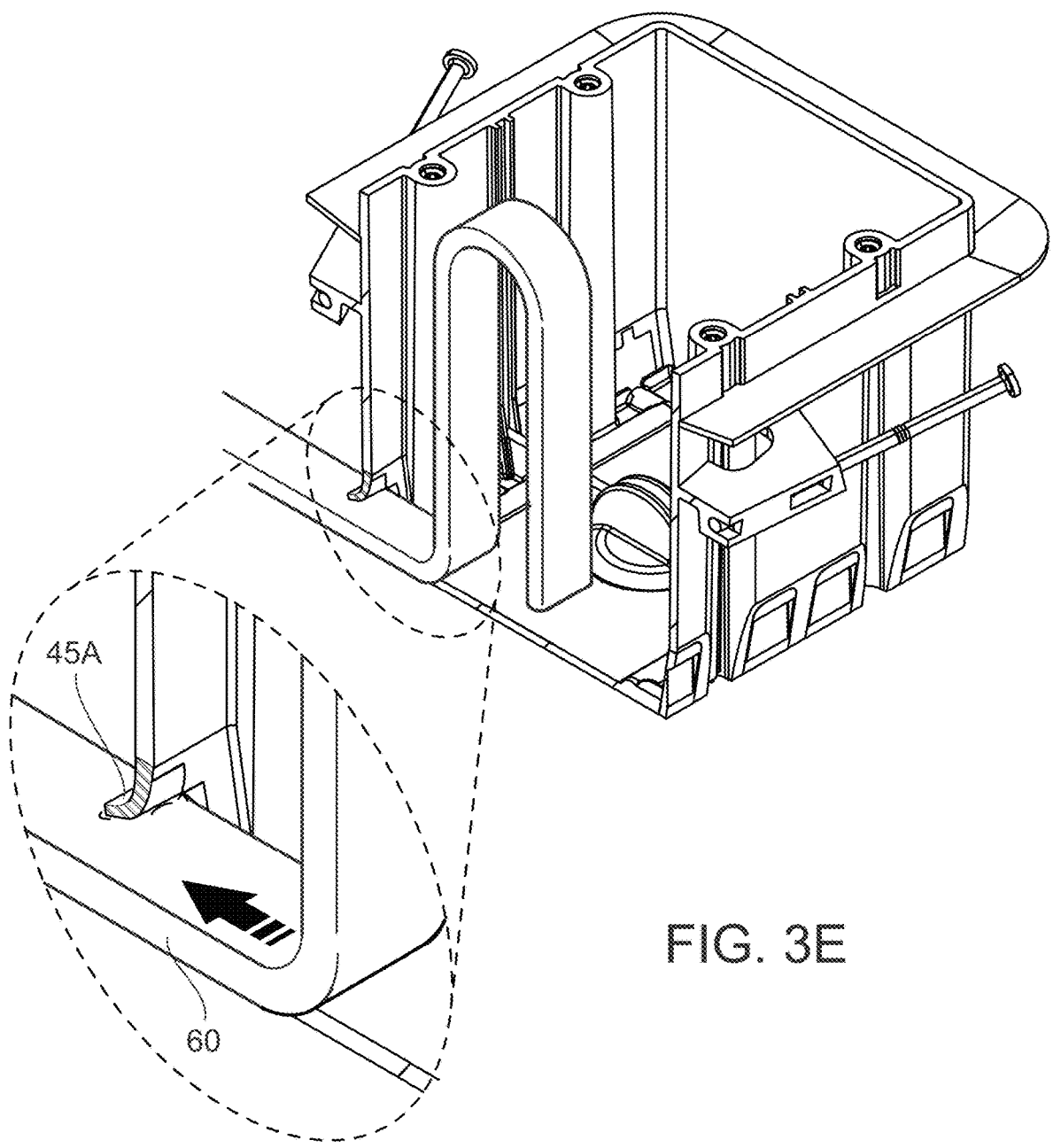
FIG. 3E is a perspective view illustrating a fifth step in installing a wire into the electrical box assembly of FIG. 1.
Figure 4:
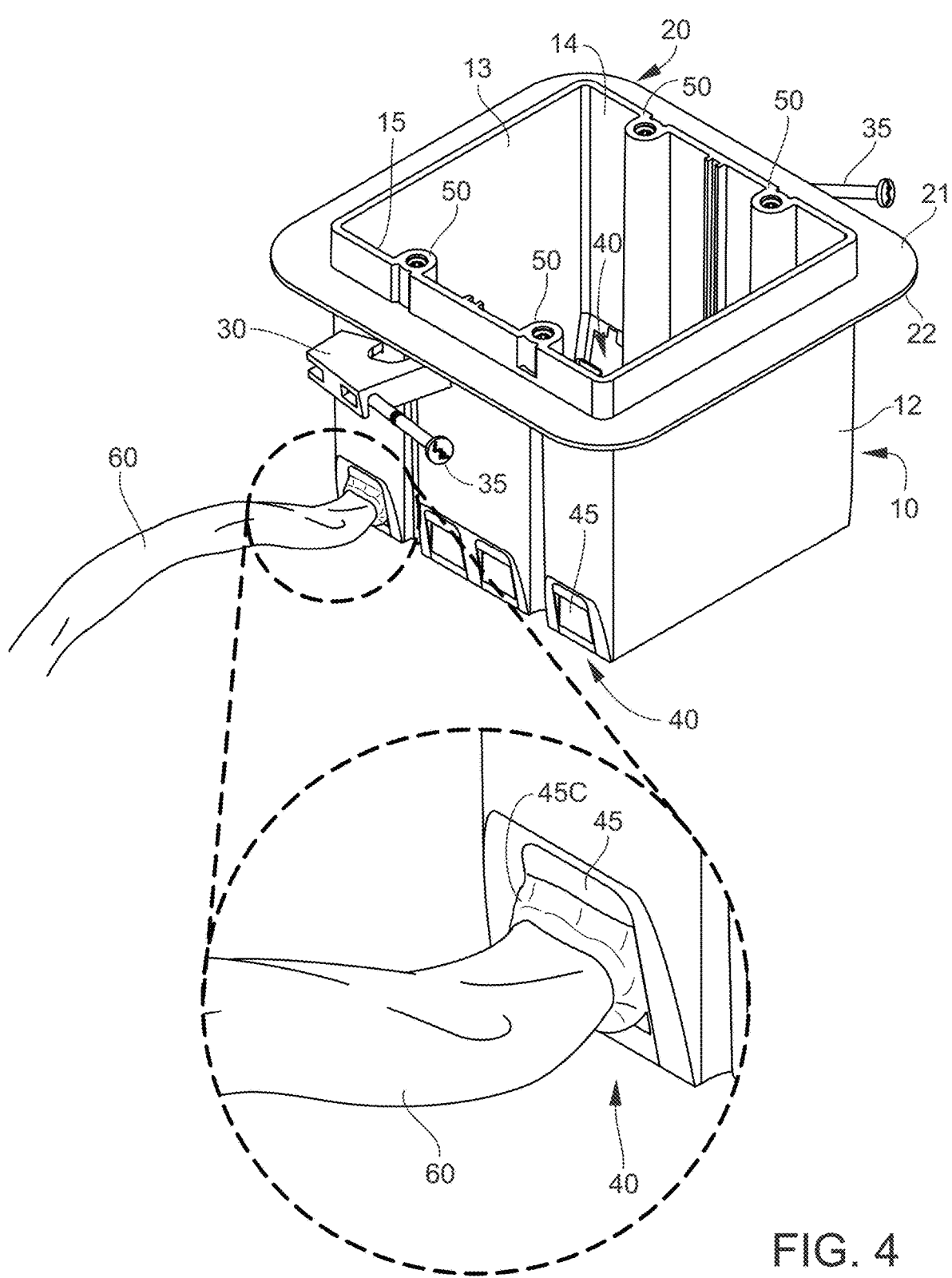
FIG. 4 is a perspective and sectional view of an electrical box assembly having wires installed therein.

At FIG. 3E, a short length of the wire 60 is optionally pulled out of the door 45 in a manner inverting the flexing of the facets 45A, 45B such that the facets 45A, 45B extend outwardly towards an exterior of the electrical box 10. The flexing of the facets 45A, 45B towards the exterior side of the door 45 also aids in further establishing a seal between the wire 60 and the facets 45A, 45B as a direct result of the configuration of the recess 47 within the exterior side of the door 45. FIGS. 2B and 3A illustrate the manner in which the first facet 45A forms the hypotenuse of a first right-angled triangle within the cross-section of the door 45 to a first side of the frangible region 45D while the second facet 45B forms the hypotenuse of a second right-angled triangle within the cross-section of the door 45 to a second side of the frangible region 45D, wherein each such hypotenuse therefore forms the longest side of the corresponding right-angled triangle. The entry of the wire 60 through the door 45 via the separation of the facets 45A, 45B at the frangible region 45D leads to the wire 60 occupying a cross-section of the opening 40 in a manner compressing the first facet 45A and the second facet 45B in opposing directions towards opposing portions of the periphery of the opening 40. The manner in which each of the facets 45A, 45B forms a longer surface than an opposing surface of the door 45 along the interior side thereof accordingly results in each of the facets 45A, 45B being compressed to a greater extent as each of the facets 45A, 45B is flexibly rotated to extend outwardly towards the exterior side of the door 45. The manner in which these longer surfaces are compressed to a greater extent during this inversion of the facets 45A, 45B to extend outwardly results in the door 45 applying a clamping force to the wire 60 for establishing a seal 45 around the outer surface of the wire 60 while also aiding in maintaining a configuration of the wire 60 relative to the electrical box 10 following passage of the wire 60 through one of the doors 45. The outward pulling of the wire 60 to result in the outwardly extending configuration of the door 45 shown in FIG. 3E results in the formation of a seal 45C between the door 45 and the wire 60, as seen in FIG. 4. That is, the clamping force generated by the described configuration of the facets 45A, 45B, when separated from one another at the frangible region 45D and resiliently pressing against the outer surface of the wire 60, aids in forming the seal 45C at the outer surface of the wire 60 as the door 45 attempts to return to its original configuration prior to entry of the wire 60 therethrough.

Figure 5:
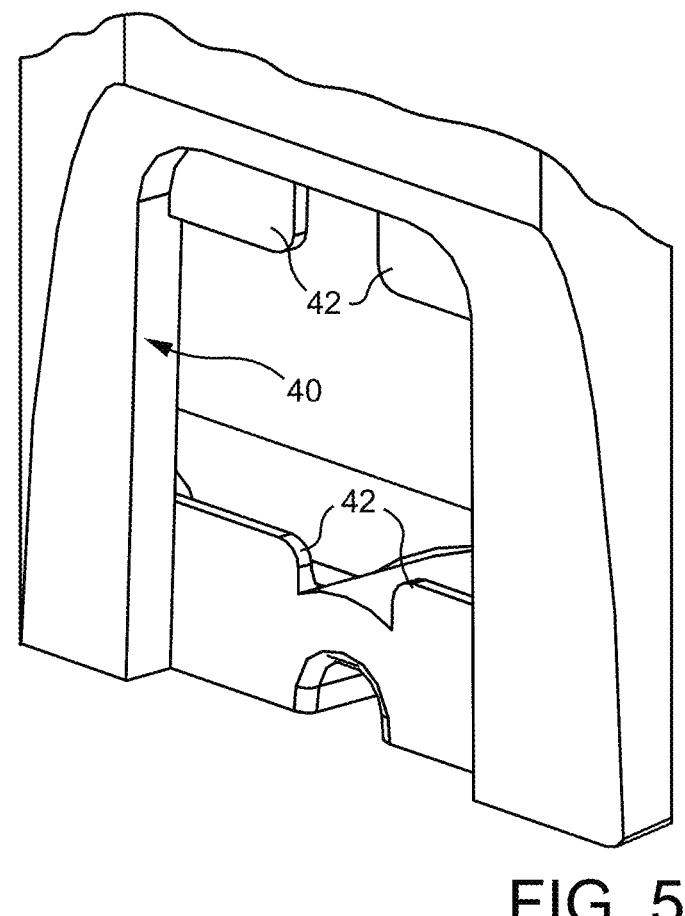
FIG. 5 is a sectional view of an opening in an electrical box assembly according to an embodiment of the present invention.

The opening 40, without the door 45 formed therein, is illustrated in FIG. 5 for more easily disclosing the structure of the portions of the electrical box 10 defining the opening 40 therein. The electrical box 10 includes a plurality of tabs 42 projecting from the periphery of the opening 40 with the tabs 42 configured to hold the wire 60 in place through the door 45. In the illustrated embodiment, four of the tabs 42 project from the periphery of one of the openings 40 with each of the tabs 42 disposed at a corner of the substantially rectangular opening 40 and extending inwardly towards a central region of the opening 40. Each of the tabs 42 is shown as a substantially rectangular shaped extension or projection of the electrical box 10 having a smaller thickness than the sidewall of the electrical box 10 in which the opening 40 is formed. Each of the tabs 42 forms a portion of the electrical box 10 having a greater rigidity than the material forming the door 45 such that each of the tabs 42 aids in guiding and locating the wire 60 within the opening 40 following passage of the wire 60 therethrough. That is, the extension of each of the tabs 42 from one of the corners of the opening 40 results in the formation of a cross-shaped open space through which the wire 60 may pass, and this cross-shaped open space limits the positions of the wire 60 through the opening 40 without intruding upon the space occupied by one of the tabs 42. The tabs 42 and the configuration of the recess 47 may accordingly be selected to establish a desired configuration of the wire 60 through the opening 40 when interacting with the facets 45A, 45B of the door 45 and when located relative to the tabs 42 formed at the corners of the door 45.

Figure 7:
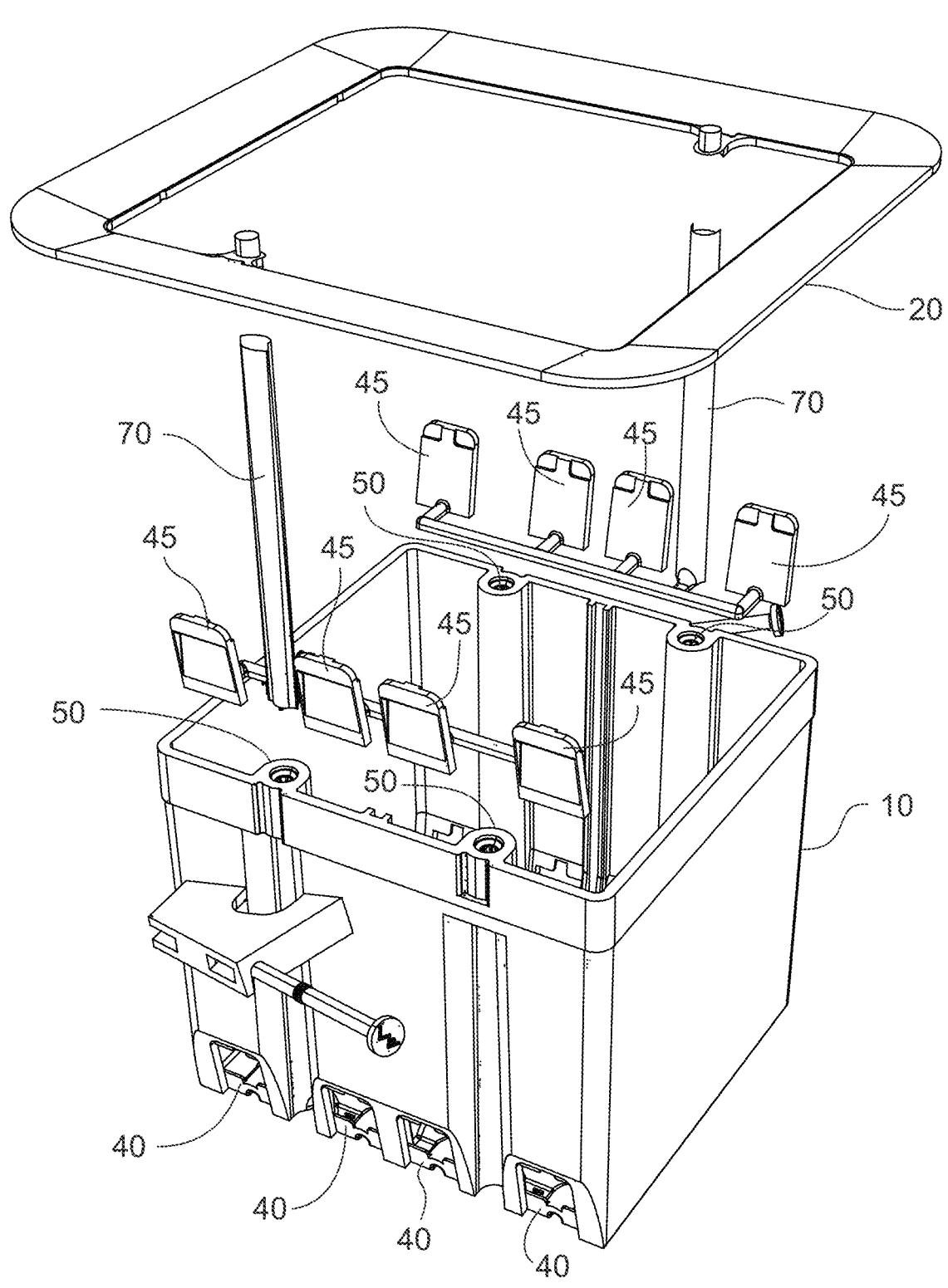
FIG. 7 is an exploded view of the electrical box assembly of FIG. 1.

The flange 20 and each of the doors 45 may be formed from a unitary structure, as shown in the exploded view in FIG. 7. The unitary structure may include one or more connecting portions 70 extending between and connecting the flange 20 to each of the doors 45. Alternatively, the flange 20 and the doors 45 may be formed separately as two different structures without necessary departing from the scope of the present invention.

The electrical box assembly 100 may be manufactured by employing an overmolding process, or a two-shot molding process. The first shot of the molding process includes the formation of a substantially rigid (when at room temperature) electrical box 10 while the second shot of the molding process includes the formation of the resiliently flexible molding (which includes the doors 45, or alternatively an assembly including the doors 45, the flange 20, and the connecting portions 70) on an outer surface of the recently molded electrical box 10. A first mold (not shown) is provided having the form and configuration suitable for forming the electrical box 10 as shown in FIG. 1, wherein the first mold is filled in conventional fashion with one of the materials described as being suitable for forming the electrical box 10 hereinabove.

Once the electrical box 10 is suitably formed and solidified using the conventional process, the electrical box 10 is repositioned relative to a second mold (not shown) for exposing an outer surface of the electrical box 10 to the molding material used to form the molding onto the electrical box 10. The segments forming the second mold close around the exterior of the electrical box 10 while forming voids around the outer surface of the electrical box 10 corresponding in shape and configuration to the different portions of the molding as shown and described herein. As mentioned previously, the material forming the molding may be injected into the second mold.

Figure 6:
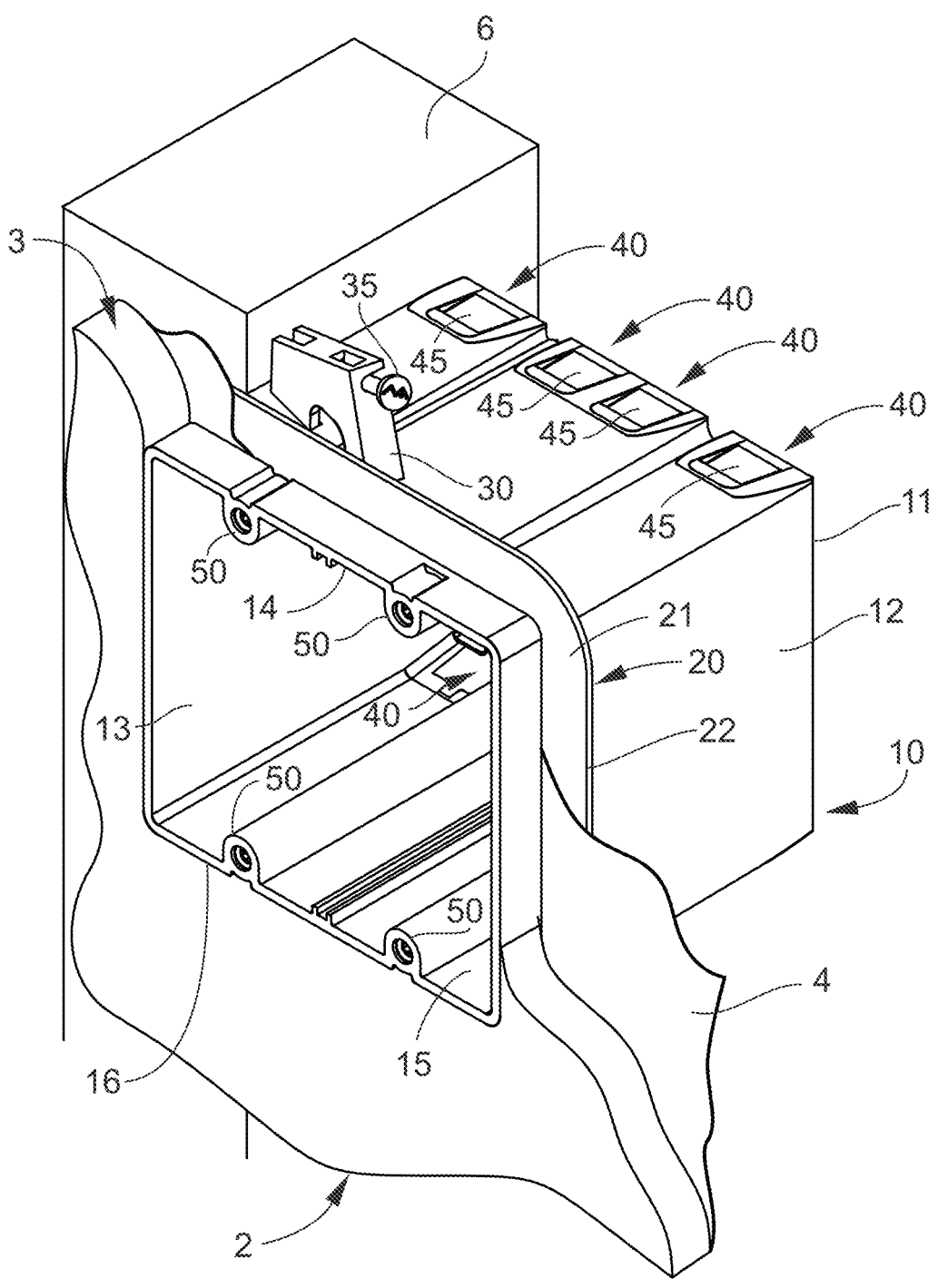
FIG. 6 is a fragmentary perspective view of a wall structure having the electrical box assembly of FIG. 1 installed therein.

During installation, as illustrated in FIG. 6, the electrical box assembly 100 is secured to the corresponding wall structure 2 and is used to enclose electrical devices and their connections to the electrical circuit of the associated building. As shown in FIG. 6, the electrical box assembly 100 is secured to a stud 6 by means of the coupling mechanism 30. More specifically, the fastener 35 penetrates the stud 6 with one of the sidewalls 13 placed in abutment with a surface of the stud 6 arranged perpendicular to the open end 16 of the electrical box 10. The flange 20 is positioned wherein the first surface 21 thereof is facing towards and abutting an inwardly facing surface of the vapor barrier 4 about a periphery of an opening formed through the drywall 3 and the vapor barrier 4. In the event that a vapor barrier 4 is not utilized in the wall structure 2, the first surface 21 of the flange 20 may instead be positioned to face towards and directly abut an inwardly facing surface of the layer of drywall 3, as desired. In either event, the abutment of the flange 20 with a surface of the wall structure 2 surrounding a periphery of the opening provides for the formation of an air-tight seal around a periphery of the electrical box 10 when in the position shown in FIG. 6. In some embodiments, an adhesive (not shown) or double-sided tape (not shown) may be applied to the first surface 21 of the flange 20 immediately prior to installation of the electrical box assembly 100 to further secure the flange 20 against the inwardly facing surface of the drywall 3 or the vapor barrier 4, thereby ensuring that the air-tight seal is maintained following installation of the electrical box assembly 10.

The inclination of the flange 20 towards the open end 16 of the electrical box 10 also aids in maintaining the air-tight seal around the periphery of the electrical box 10 by means of the resilient flexibility of the material forming the flange 20. Specifically, the installation of the electrical box assembly 100 to a position wherein the open end 16 of the electrical box 10 is flush with an outwardly facing surface of the layer of drywall 3 may include the flange 20 being flexed from the forwardly inclined position to a position wherein the first surface 21 and the second surface 22 of the flange 20 are arranged substantially parallel to the open end 16 of the electrical box 10. The resiliency of the flange 20 causes the flange 20 to attempt to return to the forwardly inclined pre-installed position, which in turn causes the first surface 21 of the flange 20 to apply a force to the inwardly facing surface of the wall structure 2. The resilient force accordingly biases the flange 20 towards the described sealing configuration in the absence of intervening components such as additional fasteners or the like.

Although the electrical box 10 is shown as having a rectangular peripheral shape, it should be understood by one skilled in the art that the general concepts of the present invention may be easily adapted to alternative peripheral shapes without departing from the scope of the present invention. For example, a cylindrical electrical box may include a circular flange projecting outwardly from an outer circumferential surface of the electrical box while the knock outs may be formed at desired locations on the outer circumferential surface adjacent and rearward of the flange, such as at diametrically opposed portions of the outer circumferential surface for forming the same general configuration of the connecting portions and knock outs as is disclosed in the embodiment of FIG. 1.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly comprising:
    a box structure comprising a closed end, an oppositely arranged open end, and an interior surrounded by at least one sidewall connecting the open end to the closed end;
    an opening formed in one of the at least one sidewall or the closed end of the box structure; and
    a door disposed within the opening and having an outward-facing surface and an inward-facing surface, wherein the door is formed from a resiliently flexible elastomeric material, wherein the inward-facing surface is planar in shape when extending across the opening, wherein the door includes an angled recess defined by at least two adjacent facets of the outward-facing surface oppositely inclined relative to the planar inward-facing surface and meeting at a frangible region of the door formed as an interior corner where the at least two adjacent facets of the outward-facing surface meet and where the door has a localized minimum thickness present between the outward-facing surface and the inward-facing surface, wherein the frangible region of the door is configured to be penetrated by a wire to separate a first facet of the at least two adjacent facets from a second facet of the at least two adjacent facets along the frangible region to provide access to the interior of the box structure, wherein the door is configured to be penetrated by the wire when the wire moves inwardly in a direction towards the interior of the box structure with the first facet and the second facet flexed inwardly towards the interior of the box structure, wherein, following a penetration of the door via movement of the wire inwardly in the direction towards the interior of the box structure, a clamping force applied to an outer surface of the wire by the first facet and the second facet is increased when the wire is moved outwardly in a direction away from the interior of the box structure to cause the first facet and the second facet to be flexed outwardly to an inverted configuration extending away from the interior of the box structure beyond the corresponding sidewall or closed end of the box structure having the associated opening formed therein while engaging the outer surface of the wire, wherein the increase in the clamping force applied to the outer surface of the wire is caused by a degree of compression of each of the first facet and the second facet increasing as the first facet and the second facet are inverted from flexing inwardly to flexing outwardly beyond the corresponding sidewall or closed end of the box structure having the associated opening formed therein while attempting to resiliently return to a configuration of the first facet and the second facet prior to penetration of the frangible region by the wire.

2. The electrical box assembly according to claim 1, wherein the door is formed from a different material than the box structure.

3. The electrical box assembly according to claim 2, wherein the box structure is not formed from a resiliently flexible material.

4. The electrical box assembly according to claim 1, further comprising:
    a flange extending outwardly from an outer surface of the at least one sidewall at a position intermediate the open end and the closed end of the box structure.

5. The electrical box assembly according to claim 4, wherein the flange includes a first surface facing towards the open end of the box structure, wherein the first surface of the flange is inclined towards the open end of the box structure as the flange extends away from the outer surface of the at least one sidewall.

6. The electrical box assembly according to claim 4, wherein the door and the flange are each formed from the same resiliently flexible elastomeric material.

7. The electrical box assembly according to claim 6, wherein the door and the flange are formed as a unitary structure.

8. The electrical box assembly according to claim 7, wherein the unitary structure is formed in an overmolding process performed on the box structure.

9. The electrical box assembly according to claim 1, wherein a plurality of tabs extends inwardly from a perimeter of the opening for retaining a position of a wire within the door, wherein each of the tabs is formed at one of four corners of the opening and wherein an open space formed between the tabs formed at the four corners of the opening is cross-shaped for limiting positions of the wire through the opening.

10. A method of using an electrical box assembly, the method comprising:
    providing an electrical box assembly, the electrical box assembly comprising:

a box structure comprising a closed end, an oppositely arranged open end, and an interior surrounded by at least one sidewall connecting the open end to the closed end;

an opening formed in one of the at least one sidewall or the closed end of the box structure; and a door disposed within the opening and having an outward-facing surface and an inward-facing surface, wherein the door is formed from a resiliently flexible elastomeric material, wherein the inward-facing surface is planar in shape when extending across the opening, wherein the door includes an angled recess defined by at least two adjacent facets of the outward-facing surface oppositely inclined relative to the planar inward-facing surface and meeting at a frangible region of the door formed as an interior corner where the at least two adjacent facets of the outward-facing surface meet and where the door has a localized minimum thickness present between the outward-facing surface and the inward-facing surface;

penetrating the door with a wire, the penetrating of the door including the wire entering the angled recess formed in the outward-facing surface of the door to press against and pierce the door along the frangible region, wherein the frangible region of the door being penetrated by the wire includes separation of a first facet of the at least two adjacent facets from a second facet of the at least two adjacent facets along the frangible region; and pushing a first length of the wire through the door and into the interior of the box structure to cause the first facet and the second facet to flex inwardly towards the interior of the box structure; and pulling a second length of the wire out of the box structure in a direction away from the interior thereof following the pushing of the first length of the wire through the door and into the interior of the box structure, wherein the pushing of the first length of the wire through the door and into the interior of the box structure includes the first facet and the second facet being flexed inwardly by the wire towards the interior of the box structure, and wherein the pulling of the second length of the wire out of the box structure in the direction away from the interior thereof includes a clamping force applied to an outer surface of the wire by the first facet and the second facet being increased as the first facet and the second facet are flexed outwardly to an inverted configuration extending away from the interior of the box structure beyond the corresponding sidewall or closed end of the box structure having the associated opening formed therein while engaging the outer surface of the wire, and wherein the increase in the clamping force applied to the outer surface of the wire is caused by a degree of compression of each of the first facet and the second facet increasing as the first facet and the second facet are inverted from flexing inwardly to flexing outwardly beyond the corresponding sidewall or closed end of the box structure having the associated opening formed therein while attempting to resiliently return to a configuration of the first facet and the second facet prior to penetration of the frangible region by the wire.

11. An electrical box assembly comprising:

a box structure comprising a closed end, an oppositely arranged open end, and an interior surrounded by at least one sidewall connecting the open end to the closed end;

an opening formed in one of the at least one sidewall or the closed end of the box structure; and a door disposed within the opening and having an outward-facing surface and an inward-facing surface, the door including an angled recess defined by at least two adjacent facets of the outward-facing surface meeting at a frangible region of the door, the at least two adjacent facets of the outward-facing surface including a first facet and a second facet, wherein the first facet and the second facet are arranged at different inclinations relative to a portion of the inward-facing surface of the door disposed opposite the angled recess the door configured to be penetrated at the frangible region thereof to provide access to the interior of the box structure, and wherein a first distance present between the frangible region and a first edge of the first facet disposed at the perimeter of the angled recess opposite the frangible region is less than a second distance present between the frangible region and a second edge of the second facet disposed at the perimeter of the angled recess opposite the frangible region.

* * * * *